United States Patent
Gotou et al.

(10) Patent No.: US 11,052,925 B2
(45) Date of Patent: Jul. 6, 2021

(54) TARGET VEHICLE SPEED GENERATION METHOD AND TARGET VEHICLE SPEED GENERATION DEVICE FOR DRIVING-ASSISTED VEHICLE

(71) Applicant: Nissan Motor Co., Ltd., Yokohama (JP)

(72) Inventors: Akinobu Gotou, Kanagawa (JP); Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 3 days.

(21) Appl. No.: 16/616,998

(22) PCT Filed: Jul. 3, 2017

(86) PCT No.: PCT/JP2017/024399
§ 371 (c)(1),
(2) Date: Nov. 26, 2019

(87) PCT Pub. No.: WO2019/008647
PCT Pub. Date: Jan. 10, 2019

(65) Prior Publication Data
US 2020/0391764 A1    Dec. 17, 2020

(51) Int. Cl.
*B60W 60/00*    (2020.01)
*B60W 30/14*    (2006.01)
(Continued)

(52) U.S. Cl.
CPC ........ *B60W 60/001* (2020.02); *B60W 30/146* (2013.01); *B60W 30/162* (2013.01);
(Continued)

(58) Field of Classification Search
CPC ............. B60W 60/001; B60W 30/146; B60W 30/162; B60W 30/165; B60W 30/18009; B60W 2554/80; B60W 2520/10
See application file for complete search history.

(56) References Cited

U.S. PATENT DOCUMENTS 6,199,001 B1 *  3/2001  Ohta ................... B60K 31/0058
                                                                701/51
2009/0319148 A1 * 12/2009  Kubo .................. B60W 30/162
                                                                701/96
(Continued)

FOREIGN PATENT DOCUMENTS

CN    101407219 A    4/2009
JP    2005-28995 A    2/2005
(Continued)

*Primary Examiner* — Navid Ziaeianmehdizadeh
*Assistant Examiner* — Sean P Quinn
(74) *Attorney, Agent, or Firm* — Global IP Counselors, LLP

(57) ABSTRACT

A target vehicle speed generation device generates a target vehicle speed of a driving-assisted vehicle (autonomously driven vehicle). The target vehicle speed generation device includes a controller that includes a plurality of vehicle speed command generation units and generates a target vehicle speed for when the vehicle is to travel/stop. The controller includes a look-ahead vehicle speed command calculation unit and a lowest vehicle speed command mediation unit. The look-ahead vehicle speed command calculation unit calculates a look-ahead vehicle speed command value that comes after the elapse of a prescribed amount of time from a present time for each vehicle speed command value generated by the plurality of vehicle speed command generation units. The lowest vehicle speed command mediation unit selects a lowest value among the plurality of look-ahead vehicle speed command values calculated by the look-ahead vehicle speed command calculation unit.

15 Claims, 10 Drawing Sheets

(51) Int. Cl.
  *B60W 30/16*    (2020.01)
  *B60W 30/165*   (2020.01)
  *B60W 30/18*    (2012.01)

(52) U.S. Cl.
  CPC .... *B60W 30/165* (2013.01); *B60W 30/18009* (2013.01); *B60W 2520/10* (2013.01); *B60W 2554/80* (2020.02)

(56) References Cited

U.S. PATENT DOCUMENTS

2013/0297196 A1* 11/2013 Shida ............... B60W 30/143
                                                    701/119
2018/0079420 A1*  3/2018 Aine ................. B60W 10/18
2018/0178796 A1*  6/2018 Fukuda ............... B60W 30/16

FOREIGN PATENT DOCUMENTS

| JP | 2015-95907  A  | 5/2015  |
| JP | 2015-129701 A  | 7/2015  |
| JP | 2016-103131 A  | 6/2016  |
| JP | 2016-141387 A  | 8/2016  |
| JP | 2017-81426  A  | 5/2017  |
| WO | 2015/178839 A1 | 11/2015 |

* cited by examiner

TARGET VEHICLE SPEED GENERATION METHOD AND TARGET VEHICLE SPEED GENERATION DEVICE FOR DRIVING-ASSISTED VEHICLE

CROSS-REFERENCE TO RELATED APPLICATIONS

This application is a U.S. national stage application of International Application No. PCT/JP2017/024399, filed on Jul. 3, 2017.

BACKGROUND

Technical Field

The present disclosure relates to a method and device for generating a target vehicle speed of a driving-assisted vehicle, in which a target vehicle speed is generated based on a plurality of vehicle speed command values.

Background Information

There are known in the prior art vehicular driver-assist control devices in which a speed that ensures a braking distance is less than a distance over which forward recognition is possible is calculated as a vehicle speed limit, and a limitation is set such that, at a minimum, a target vehicle speed does not exceed the vehicle speed limit (e.g., see Japanese Laid-Open Patent Application No. 2016-141387).

SUMMARY

However, with the prior art devices, the lower of the vehicle speed limit and a target vehicle speed based on a headway distance set by a driver is selected and set as the target vehicle speed. Thus, a problem is presented that when a vehicle speed on an acceleration side relative to the vehicle speed at a present point in time is set as the target vehicle speed despite knowing that deceleration is upcoming, unnecessary acceleration will be produced and there will be a large amount of jerk (change in the rate of acceleration) at a time of transition from acceleration to deceleration.

The present disclosure focuses on the above problem, it being an object hereof to suppress unnecessary acceleration and moreover reduce jerk at a time of transition from acceleration to deceleration when traveling using driver-assistance.

In order to achieve the above objective, the present disclosure proposes a method for generating a target vehicle speed of a driving-assisted vehicle in which a target vehicle speed is generated for when the vehicle is to travel/stop based on a plurality of vehicle speed command values. A look-ahead vehicle speed command value that comes after the elapse of a prescribed amount of time from a present time is calculated for each vehicle speed command value of the plurality of vehicle speed command values. A lowest value among the plurality of calculated look-ahead vehicle speed command values is selected as the target vehicle speed.

As described above, by forecasting future values (look-ahead vehicle speed command values) and selecting the lowest value among the plurality of future values to generate a target vehicle speed, unnecessary acceleration can be suppressed and moreover jerk at a time of transition from acceleration to deceleration can be reduced when traveling using driver-assistance.

DETAILED DESCRIPTION OF THE EMBODIMENTS

Figure 1:
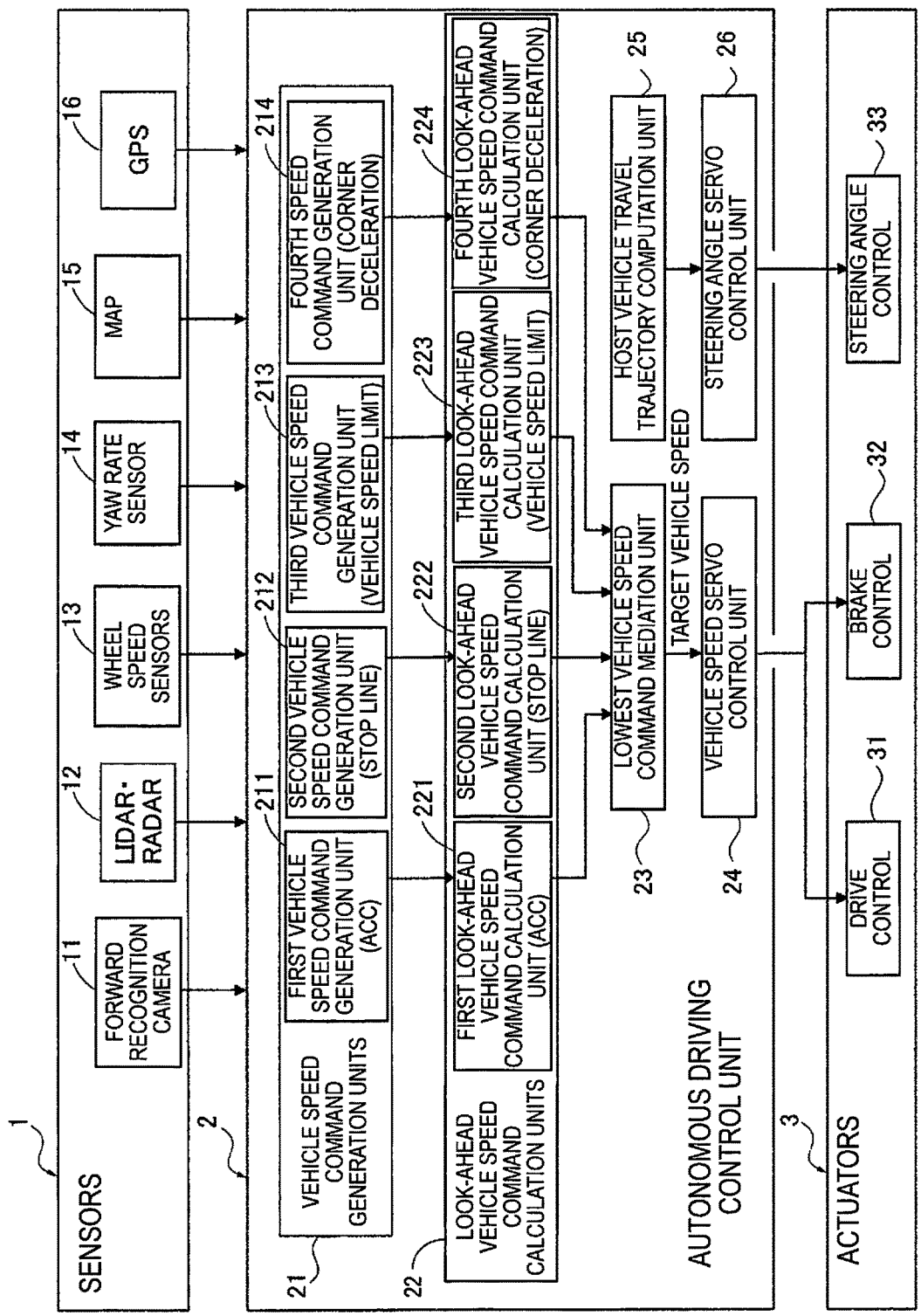
FIG. 1 is an overall system diagram illustrating an autonomous driving. control system to which a method and device for generating a target vehicle speed of the first embodiment have been applied.

A preferred embodiment for implementing method and device for generating a target vehicle speed of a driving-assisted vehicle according to the present disclosure will be described below with reference to the first embodiment illustrated in the drawings.

First, the configuration will be described. The method and device for generating a target vehicle speed of the first embodiment are applied to an autonomously driven vehicle (one example of a driving-assisted vehicle) in which steering/drive/braking are automatically controlled according to an autonomous driving mode selection. The configuration of the first embodiment will be described split into the sections "Overall system configuration," "Detailed configuration of vehicle speed command generation unit," and "Detailed configuration of look-ahead vehicle speed command calculation unit."

Overall System Configuration

FIG. 1 is an overall system diagram illustrating an autonomous driving control system to which the method and device for generating a target vehicle speed of the first embodiment have been applied. The overall system configuration will be described below with reference to FIG. 1.

As illustrated in FIG. 1, the autonomous driving control system comprises sensors 1, an autonomous driving control unit 2, and actuators 3. The autonomous driving control unit 2 is a computer that comprises a CPU or other processing unit and executes arithmetic processing.

The sensors 1 include a forward recognition camera 11, lidar/radar 12, wheel speed sensors 13, a yaw rate sensor 14, a map 15, and GPS 16.

The forward recognition camera 11 is, e.g., an onboard imaging device comprising a CCD or other imaging element, and can be an infrared camera or a stereo camera. The forward recognition camera 11 is installed at a prescribed position on the host vehicle, and images objects in areas around the host vehicle. The areas around the host vehicle are not limited to an area in front of the host vehicle, and include areas behind, to a left side, and to a right side of the host vehicle. Objects include stop lines and other two-dimensional signs that are marked on road surfaces. Objects include three-dimensional bodies. Objects include signs and other stationary objects. Objects include pedestrians, leading vehicles, and other moving bodies. Objects include guard rails, median strips, curbs, and other road structures.

The lidar/radar 12 is a ranging sensor, and any form of ranging sensor that is known at the time of application, such as a laser radar, a millimeter wave radar, an ultrasonic radar, or a laser range finder, can be employed therefor. The lidar/radar 12 includes an object detection device. The object detection device detects the existence of objects, the position of objects, and the distance to objects based on a received signal and an output signal from the lidar/radar 12. Lidar is a ranging sensor that emits light, and radar is a ranging sensor that emits electromagnetic waves.

A wheel speed sensor 13 is provided to each of the four wheels. The wheel speed sensors 13 detect a wheel speed of each wheel. An average value of the wheel speeds of left and right driven wheels is used as the detected value of the vehicle speed at a present point in time.

The yaw rate sensor 14 is an attitude sensor that detects a yaw rate of the vehicle (an angular velocity of rotation about a vertical axis passing through the center of gravity of the vehicle). Attitude sensors encompass gyroscope sensors, which can detect a pitch angle, a yaw angle, and a roll angle of a vehicle.

The map 15 is a so-called digital map, and is information that associates latitude/longitude and map information. The map 15 includes road information that has been associated with respective points. The road information is defined by nodes and links that connect nodes together. The road information includes information that specifies roads according to road position/area, and information indicating a type of each road, a width of each road, and road geometry. The position of intersections, the directions of approach of intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), vehicle speed limit, and other information relating to roads is also stored in association with respective identification information for each road link in the road information.

The GPS 16 (short for "global positioning system") detects a travel position (latitude and longitude) of the host vehicle during travel.

The autonomous driving control unit 2 comprises vehicle speed command generation units 21, look-ahead vehicle speed command calculation units 22, a lowest vehicle speed command mediation unit 23, a vehicle speed servo control unit 24, a host vehicle travel trajectory computation unit 25, and a steering angle servo control unit 26.

The vehicle speed command generation units 21 comprise a first vehicle speed command generation unit (ACC) 211, a second vehicle speed command generation unit (stop line) 212, a third vehicle speed command generation unit (vehicle speed limit) 213, and a fourth vehicle speed command generation unit (corner deceleration) 214. Each of the plurality of vehicle speed command generation units 211, 212, 213, 214 generates vehicle speed command values and target rates of acceleration.

The look-ahead vehicle speed command calculation units 22 comprise a first look-ahead vehicle speed command calculation unit (ACC) 221, a second look-ahead vehicle speed command calculation unit (stop line) 222, a third look-ahead vehicle speed command calculation unit (vehicle speed limit) 223, and a fourth look-ahead vehicle speed command calculation unit (corner deceleration) 224. A look-ahead vehicle speed command value that comes after the elapse of a prescribed amount of time from a present time is calculated for each vehicle speed command value generated by the plurality of vehicle speed command generation units 211, 212, 213, 214.

The lowest vehicle speed command mediation unit 23 selects a lowest value among the plurality of look-ahead vehicle speed command values calculated by the look-ahead vehicle speed command calculation units 221, 222, 223, 224, as a target vehicle speed. At the same time, in addition to selecting the target vehicle speed that has the lowest value, the lowest vehicle speed command mediation unit 23 selects a rate of acceleration/deceleration limit that corresponds to a type of the selected target vehicle speed.

The vehicle speed servo control unit 24 receives, as inputs, a current vehicle speed and a target vehicle speed from the lowest vehicle speed command mediation unit 23, derives a control command value using vehicle speed servo control, and outputs a result of this derivation to a drive control actuator 31 and a brake control actuator 32. As a method of deriving a control command value using vehicle speed servo control, for example, feedforward control plus feedback control, which combines feedforward control that corresponds to the value or rate of change of target vehicle speeds and feedback control that corresponds to a difference between the target vehicle speed and the current vehicle speed, is performed. Deviation from a target value due to road gradients or the like should also be taken into account when this is performed.

The host vehicle travel trajectory computation unit 25 computes a host vehicle travel trajectory on roads over which the host vehicle is expected to travel. the first embodiment uses a host vehicle travel trajectory computation unit 211a contained in the first vehicle speed command generation unit (ACC) 211.

The steering angle servo control unit 26 receives host vehicle travel trajectory information from the host vehicle travel trajectory computation unit 25 as input, and, for example, chooses a target yaw rate such that the host vehicle follows the travel trajectory, The steering angle servo control unit 26 derives a steering angle control value such that the actual yaw rate matches the target yaw rate, and outputs a result of this derivation to a steering angle control actuator 33.

The actuators 3 include the drive control actuator 31, the brake control actuator 32, and the steering angle control actuator 33.

In the case of a vehicle with an engine, the drive control actuator 31 is an engine drive actuator, in the case of a hybrid vehicle, the drive control actuator 31 is an engine drive actuator and a motor drive actuator, and in the case of an electric automobile, the drive control actuator 31 is a motor drive actuator. The brake control actuator 32 is an electric brake booster, a hydraulic booster, etc. The steering angle control actuator 33 is a steering angle control motor provided to the steering system.

Detailed Configuration of Vehicle Speed Command Generation Units

Detailed configuration of the vehicle speed command generation units 21 will be described below with reference to FIGS. 2 to 6.

Figure 2:
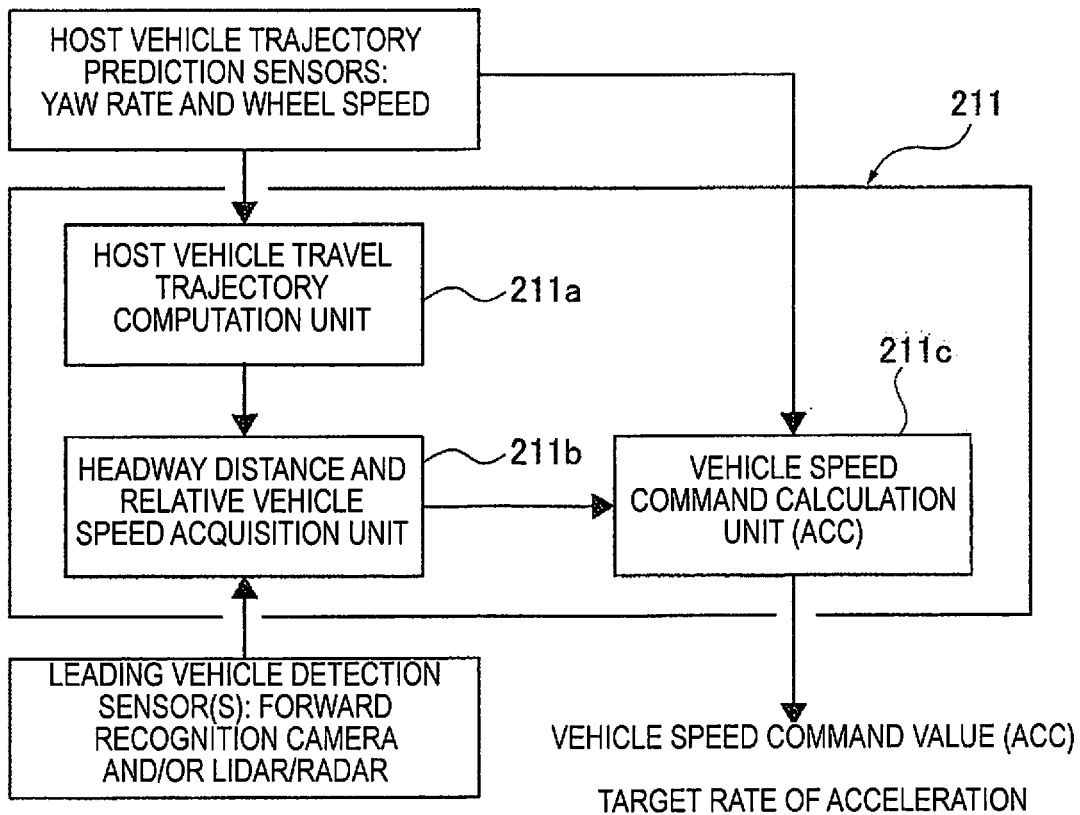
FIG. 2 is a block diagram illustrating a first vehicle speed command generation unit (ACC) of the method and device for generating a target vehicle speed of the first embodiment.

As illustrated in FIG. 2, the first vehicle speed command generation unit (ACC) 211 includes a host vehicle travel trajectory computation unit 211a, a headway distance and relative vehicle speed acquisition unit 211b, and a vehicle speed command calculation unit 211c. The host vehicle travel trajectory computation unit 211a uses the yaw rate sensor 14 and the wheel speed sensors 13 as host vehicle trajectory prediction sensors and computes a host vehicle travel trajectory. The headway distance and relative vehicle speed acquisition unit 211b uses the forward recognition camera 11 and/or the lidar/radar 12 as a leading vehicle detection sensor(s) and acquires the headway distance to and the relative vehicle speed of a leading vehicle. The vehicle speed command calculation unit 211c calculates a vehicle speed command value (ACC) and a target rate of acceleration required for the host vehicle to follow a leading vehicle in accordance with the acquired headway distance and relative vehicle speed, and with current vehicle speed information.

Vehicle speed profiles for target vehicle speeds made up of constant speeds and acceleration/deceleration depending on, inter alia, the presence or absence of a leading vehicle are produced in the vehicle speed command calculation unit 211c. Vehicle speed command values (target vehicle speeds) are determined according to position beyond a current position using the vehicle speed profile that was produced. In such instances, a rate of acceleration or a rate of deceleration required to reach a target vehicle speed at a prescribed position beyond a current vehicle position is set as the target rate of acceleration.

Herein, "ACC (short for 'adaptive cruise control')" refers to, when a leading vehicle is detected, setting a vehicle speed set by a driver as a maximum vehicle speed and performing headway control so as to maintain a headway distance at a corresponding vehicle speed. When a leading vehicle is not detected, constant-speed travel is performed at the vehicle speed set by the driver. In addition, when a leading vehicle has stopped, the host vehicle also stops after the leading vehicle.

Figure 3:
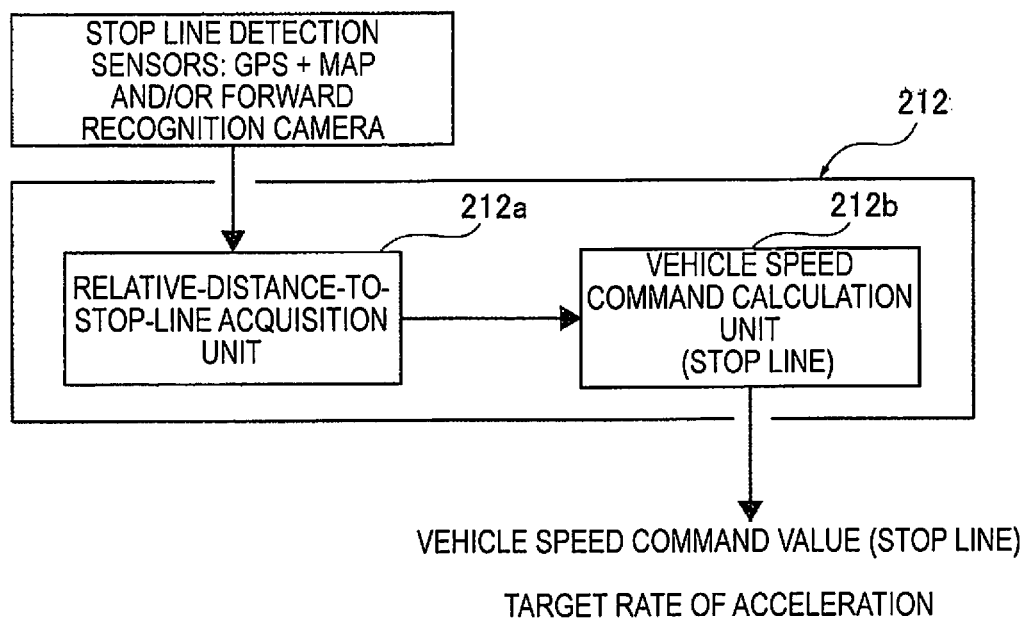
FIG. 3 is a block diagram illustrating a second vehicle speed command generation unit (stop line) of the method and device for generating a target vehicle speed of the first embodiment.

As illustrated in FIG. 3, the second vehicle speed command generation unit (stop line) 212 includes a relative-distance-to-stop-line acquisition unit 212a and a vehicle speed command calculation unit 212b. The relative-distance-to-stop-line acquisition unit 212a uses the GPS 16 plus the map 15, and/or the forward recognition camera 11 to acquire a distance from the host vehicle to a stop line. The vehicle speed command calculation unit 212b calculates a vehicle speed command value (stop line) and a target rate of acceleration required to decelerate and stop within the acquired relative distance to a stop line.

Figure 4:
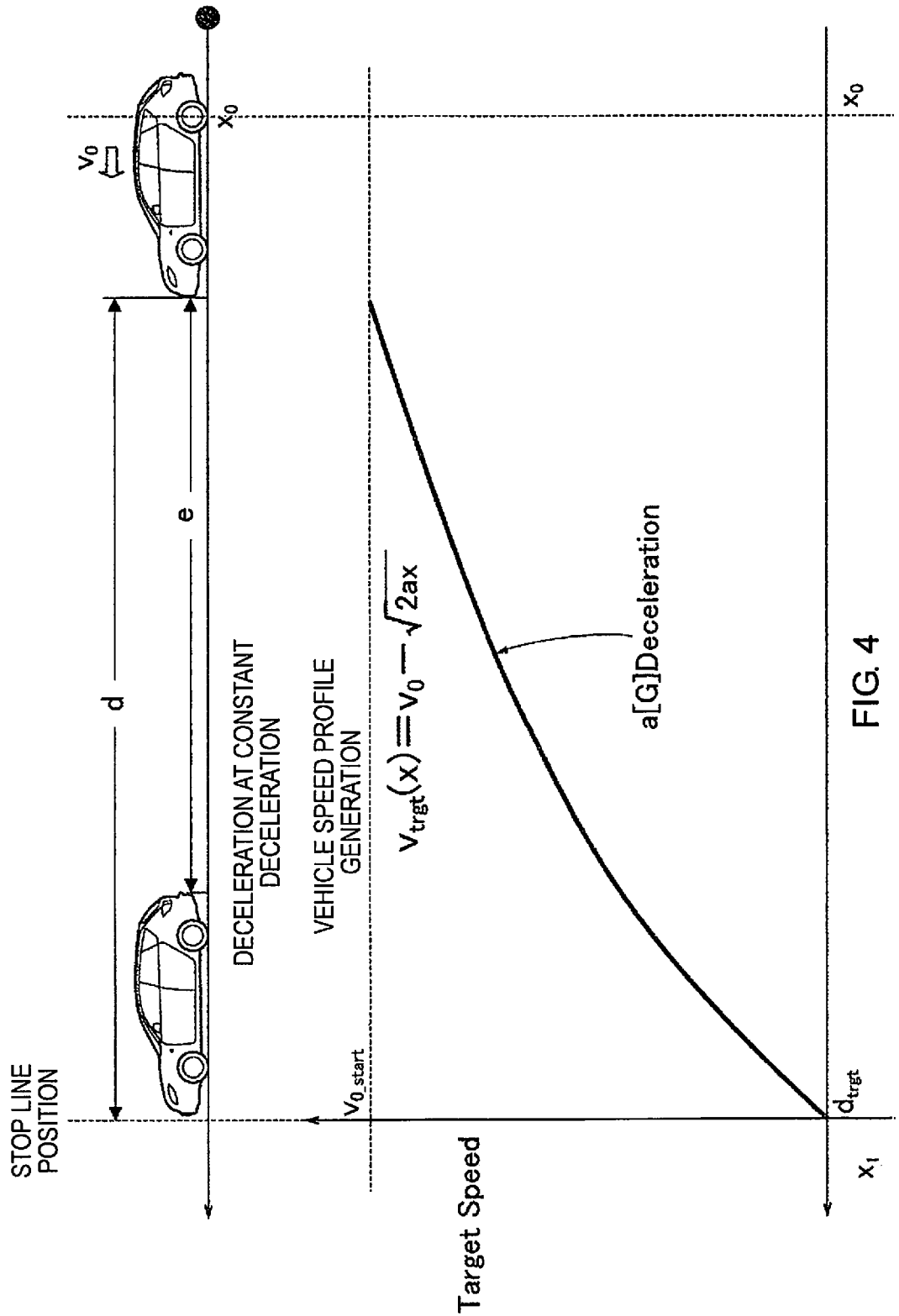
FIG. 4 is a vehicle speed profile characteristic chart illustrating an example vehicle speed profile generated by the second vehicle speed command generation unit (stop line).

As illustrated in FIG. 4, a vehicle speed profile (i.e., target vehicle speed profile) representing a change in the target vehicle speed when decelerating at a constant rate of deceleration a is produced in the vehicle speed command calculation unit 212b based on a vehicle speed on starting deceleration $v_0$ and a distance $d_{trgt}$ from the host vehicle to a stop line. A vehicle speed profile $v_{trgt}(x)$ is expressed by the following equation.

$$v_{trgt}(x)=v_0-\sqrt{2ax}$$

In the vehicle speed profile $v_{trgt}(x)$ that is produced, vehicle speed command values (target vehicle speeds) are determined according to the position x beyond a position on starting deceleration $x_0$. In such instances, the constant rate of deceleration a is set as the target rate of acceleration.

Figure 5:
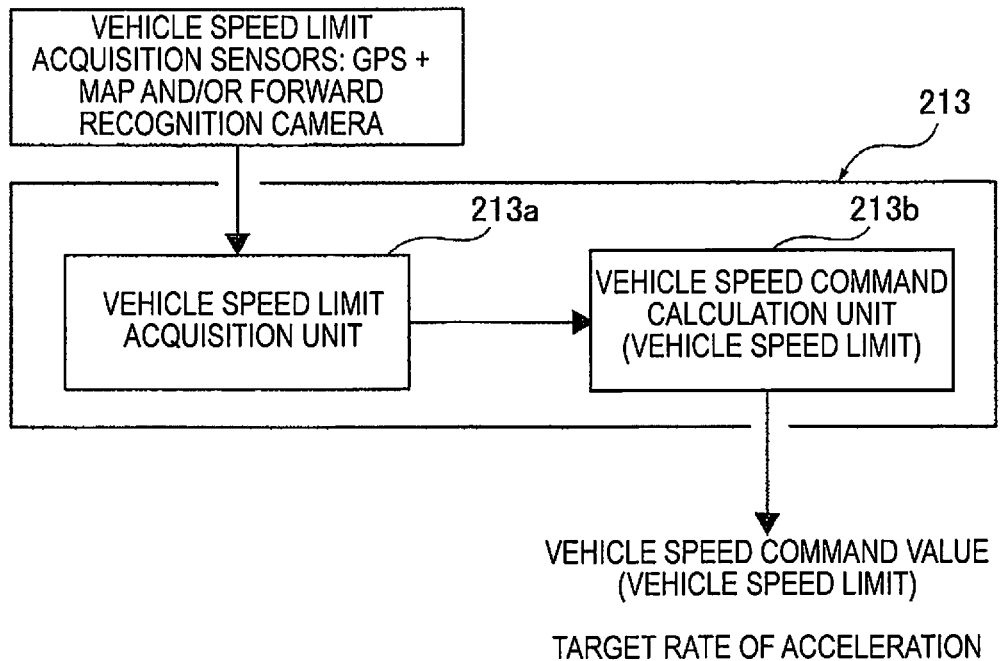
FIG. 5 is a block diagram illustrating a third vehicle speed command generation unit (vehicle speed limit) of the method and device for generating a target vehicle speed of the first embodiment.

As illustrated in FIG. 5, the third vehicle speed command generation unit (vehicle speed limit) 213 includes a vehicle speed limit acquisition unit 213a and a vehicle speed command calculation unit 213b. The vehicle speed limit acquisition unit 213a uses the GPS 16 plus the map 15, and/or the forward recognition camera 11, as a vehicle speed limit acquisition sensor to acquire vehicle speed limit information for roads. The vehicle speed command calculation unit 213b calculates a vehicle speed command value (vehicle speed limit) and a target rate of acceleration required to follow the acquired vehicle speed limit.

In accordance with the acquired vehicle speed limit, a vehicle speed profile for target vehicle speeds that keep the speed of the host vehicle at or below the vehicle speed limit is produced in the vehicle speed command calculation unit 213b. Vehicle speed command values (target vehicle speeds) are determined according to position beyond a current position using the vehicle speed profile that was produced. In such instances, a rate of acceleration or a rate of deceleration required to reach a target vehicle speed at a prescribed position beyond a current vehicle position is set as the target rate of acceleration.

Figure 6:
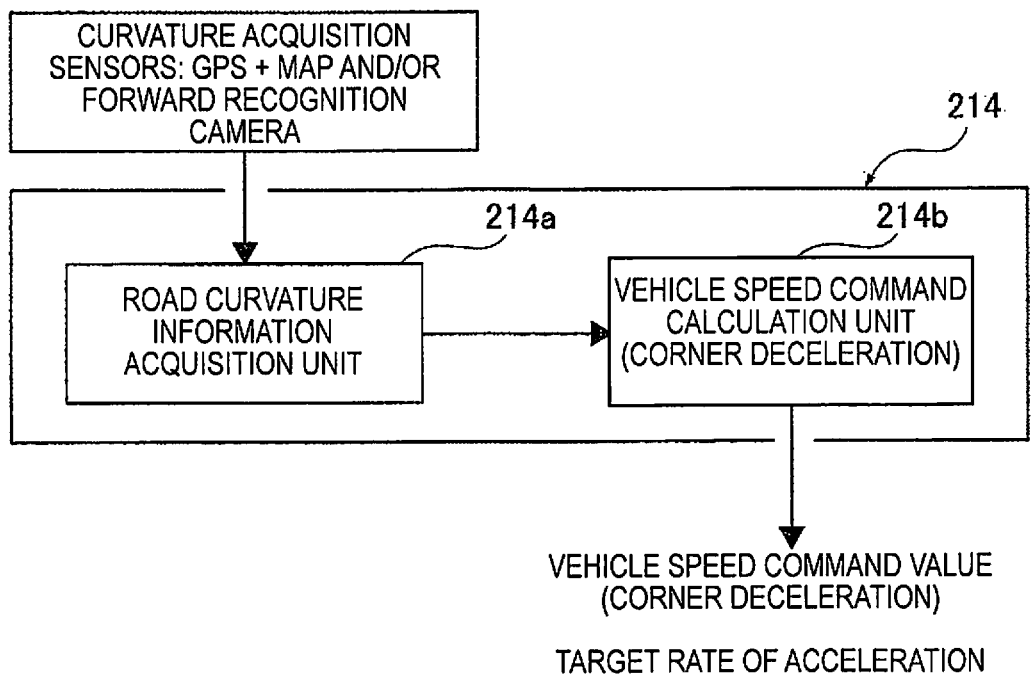
FIG. 6 is a block diagram illustrating a fourth vehicle speed command generation unit (corner deceleration) of the method and device for generating a target vehicle speed of the first embodiment.

As illustrated in FIG. 6, the fourth vehicle speed command generation unit (corner deceleration) 214 includes a road curvature information acquisition unit 214a and a vehicle speed command calculation unit 214b. The road curvature information acquisition unit 214a uses the GPS 16 plus the map 15, and/or the forward recognition camera 11, as a curvature acquisition sensor to acquire a curvature of a traveled-on road. The vehicle speed command calculation unit 214b calculates a vehicle speed command value (corner deceleration) and a target rate of acceleration not exceeding a maximum lateral rate of acceleration that is set in advance in accordance with the acquired road curvature information.

A vehicle speed profile for target vehicle speeds to exit a corner in accordance with the acquired curvature of a traveled-on road is produced in the vehicle speed command calculation unit 214b. Vehicle speed command values (target vehicle speeds) are determined according to position beyond the current position using the vehicle speed profile that was produced. In such instances, a rate of acceleration or a rate of deceleration required to reach a target vehicle speed at a prescribed position beyond the current position is set as the target rate of acceleration.

Detailed Configuration of Look-Ahead Vehicle Speed Command Calculation Units

Detailed configuration of the look-ahead vehicle speed command calculation units 22 will be described below with reference to FIG. 7. The basic configuration of each of the first look-ahead vehicle speed command calculation unit (ACC) 221, the second look-ahead vehicle speed command calculation unit (stop line) 222, the third look-ahead vehicle speed command calculation unit (vehicle speed limit) 223, and the fourth look-ahead vehicle speed command calculation unit (corner deceleration) 224 is as illustrated in FIG. 7.

Figure 7:
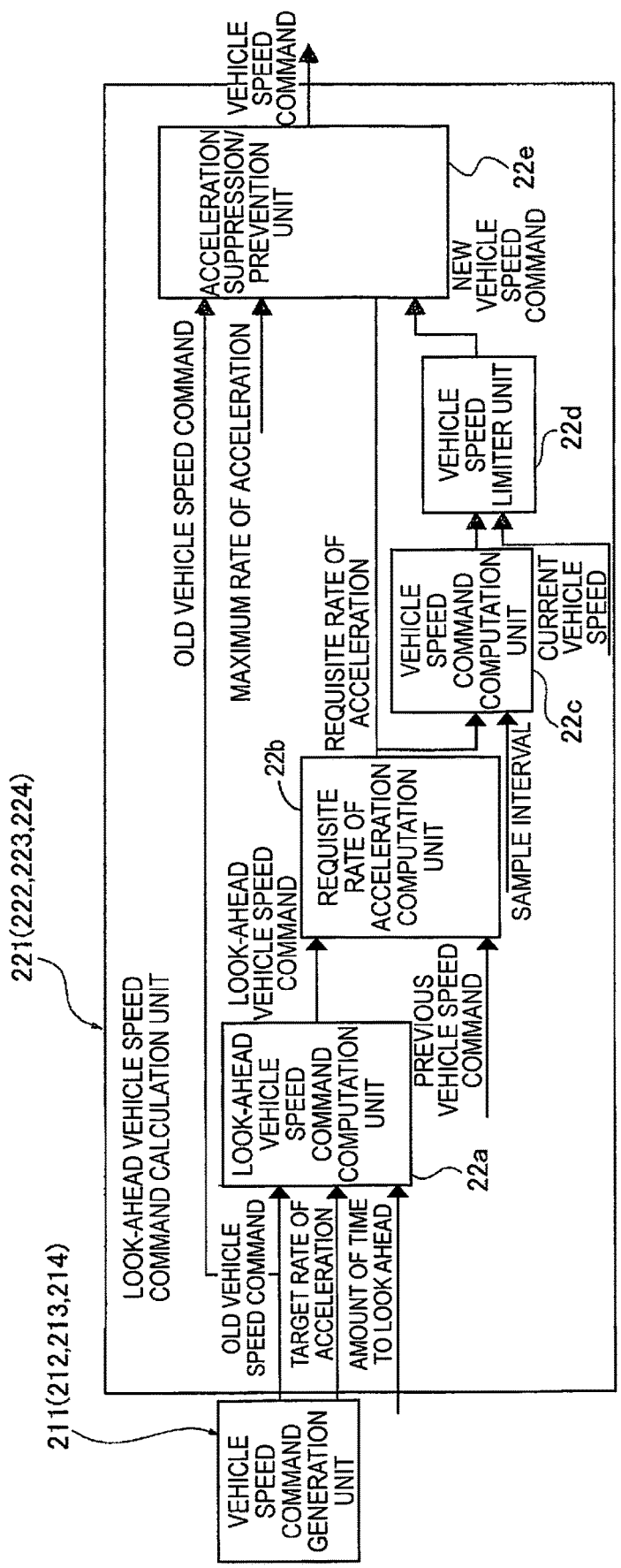
FIG. 7 is a block diagram illustrating detailed configuration of look-ahead vehicle speed command calculation units of the method and device for generating a target vehicle speed of the first embodiment.

As illustrated in FIG. 7, each of the look-ahead vehicle speed command calculation units 221 (222, 223, 224) includes a look-ahead vehicle speed command computation unit 22a, a requisite rate of acceleration computation unit 22b, a vehicle speed command computation unit 22c, a vehicle speed limiter unit 22d, and an acceleration suppression/prevention unit 22e.

The look-ahead vehicle speed command computation unit 22a receives, as inputs, a target rate of acceleration and a vehicle speed command value ("old vehicle speed command value" in FIG. 7) at a present point in time from the respective vehicle speed command generation unit 211 (212, 213, 214), and an amount of time to look ahead. The look-ahead vehicle speed command computation unit 22a computes a look-ahead vehicle speed command value that comes after the elapse of the amount of time to look ahead based on the vehicle speed command value for the present point in time and the target rate of acceleration. In other words, in the vehicle speed profiles generated by the vehicle speed command generation units 211, 212, 213, 214, vehicle speed command values (target vehicle speeds) that come after the elapse of a prescribed amount of time to look ahead from the present point in time are computed as look-ahead vehicle speed command values.

Regarding setting the "amount of time to look ahead," the "amount of time to look ahead" is set using an amount of time that can change (for example, from 2 sec to 5 sec, approximately) in accordance with the conditions (a) to (d) given below.
(a) When the amount of time to look ahead is changed according to targeted acceleration/deceleration behavior, in situations where delayed-response control is desired, the amount of time to look ahead is set to a longer amount of time than in situations where heightened-response control is desired.
(b) In situations where a vehicle speed command value is a vehicle speed command value relating to a vehicle speed limit (third look-ahead vehicle speed command calculation unit 223), the amount of time to look ahead is set longer than for other vehicle speed command values.
(c) When the amount of time to look ahead is changed according to targeted acceleration/deceleration behavior, in situations where heightened-response control is desired, the amount of time to look ahead is set to a shorter amount of time than in situations where delayed-response control is desired.
(d) In situations where the vehicle speed command value is a vehicle speed command value relating to following a leading vehicle (first look-ahead vehicle speed command calculation unit 221), the amount of time to look ahead is set shorter than for other vehicle speed command values.

The requisite rate of acceleration computation unit 22b receives, as inputs, a look-ahead vehicle speed command value from the look-ahead vehicle speed command computation unit 22a and a next-most-recent vehicle speed command value. The requisite rate of acceleration computation unit 22b computes a rate of acceleration required to reach the most recent look-ahead vehicle speed command value from the next-most-recent vehicle speed command value.

The vehicle speed command computation unit 22c receives, as inputs, a requisite rate of acceleration computed by the requisite rate of acceleration computation unit 22b and a computation period (sample interval). The vehicle speed command computation unit 22c computes a vehicle speed command value for the current time from the requisite rate of acceleration, the computation period, and the next-most-recent vehicle speed command value.

The vehicle speed limiter unit 22d receives, as inputs, a vehicle speed command value for the current time computed by the vehicle speed command computation unit 22c and a current vehicle speed. When the vehicle speed command value for the current time exceeds a range of vehicle speeds the target vehicle speed is capable of handling that is chosen based on the current vehicle speed, the vehicle speed command value for the current time is limited by the range of vehicle speeds the target vehicle speed is capable of handling. Here, the "range of vehicle speeds that the target vehicle speed is capable of handling" refers to a range of target vehicle speeds to which a change in vehicle speed from a current vehicle speed is permitted. This is, for example, chosen using a range of vehicle speeds from a minimum vehicle speed obtained by subtracting, from the current vehicle speed, a deceleration-side range of permitted vehicle speed deviation to a maximum vehicle speed obtained by adding, to the current vehicle speed, an acceleration-side range of permitted vehicle speed deviation.

The acceleration suppression/prevention unit 22e receives, as inputs, an old vehicle speed command from the respective vehicle speed command generation unit 211 (212, 213, 214), a maximum rate of acceleration, a requisite rate of acceleration from the requisite rate of acceleration computation unit 22b, and a new vehicle speed command from the vehicle speed limiter unit 22d. In situations where the requisite rate of acceleration has exceeded the maximum rate of acceleration, which is set beforehand, rather than selecting the new vehicle speed command (the most recent look-ahead vehicle speed command value), the acceleration suppression/prevention unit 22e selects the old vehicle speed command (the next-most-recent vehicle speed command value). The vehicle speed command value selected by the acceleration suppression/prevention unit 22e is set as the final vehicle speed command value (target vehicle speed) outputted to the lowest vehicle speed command mediation unit 23.

Next, the operation will be described. The operation of the first embodiment will be described split into the sections "Operation for generating a target vehicle speed in a comparative embodiment," "Operation for process of generating a target vehicle speed," "Operation for generating a target vehicle speed in a deceleration-to-a-stop scenario in which there is a stop line," "Operation for generating a target vehicle speed in a deceleration-to-a-stop scenario in which there is stopped vehicle," and "Operation for generating a target vehicle speed in a decelerate-while-turning scenario."

Operation for Generating a Target Vehicle Speed in a Comparative Embodiment

Figure 9:
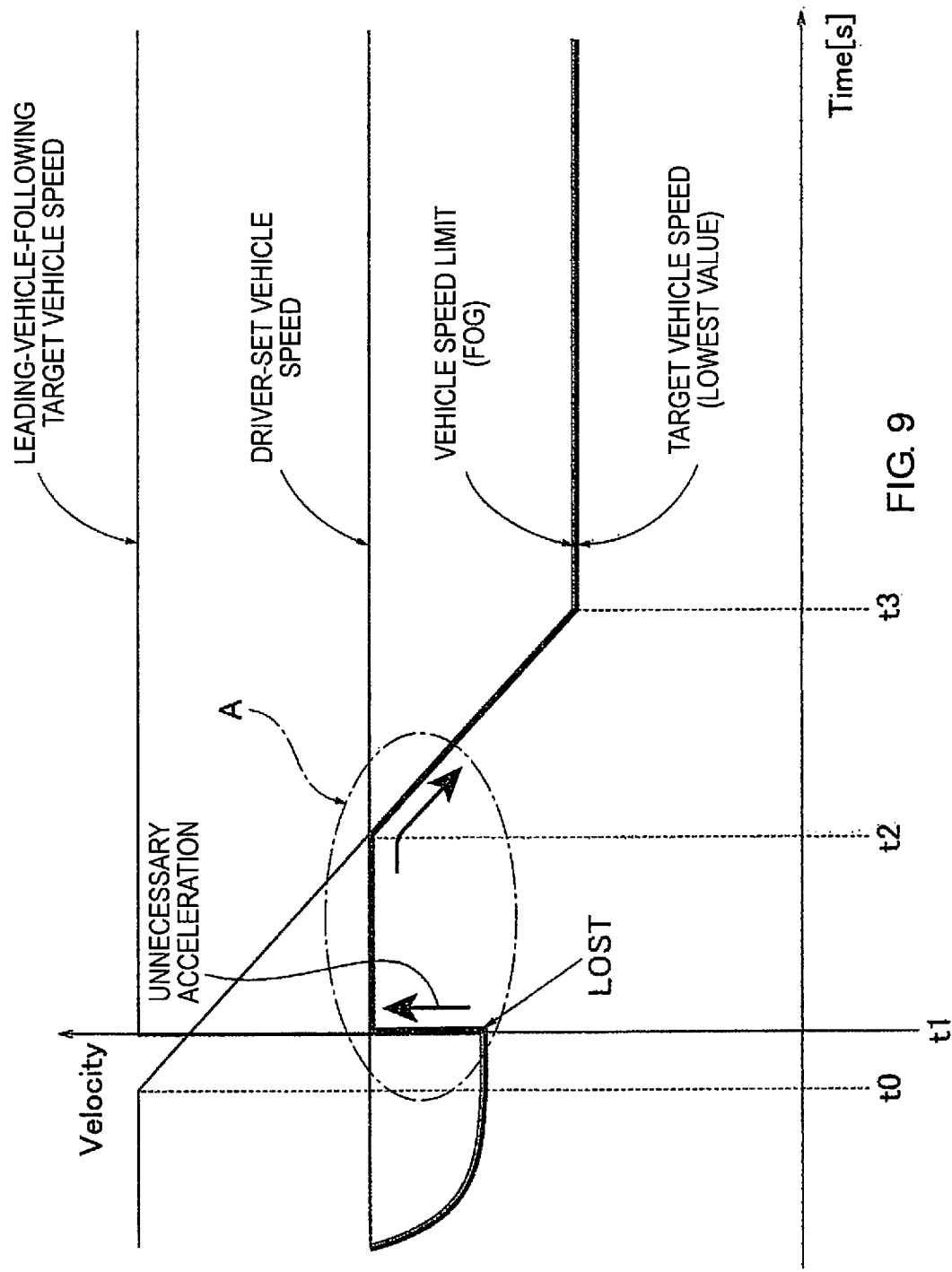
FIG. 9 is a time chart illustrating target vehicle speed (lowest value) characteristics in a travel scenario in which immediately after starting to decelerate to a speed limit due to fog appearing, a leading vehicle is lost in a comparative embodiment.

FIG. 9 illustrates target vehicle speed (lowest value) characteristics in a travel scenario in which immediately after starting to decelerate to a speed limit due to fog appearing, a leading vehicle is lost. Operation for generating a target vehicle speed in the comparative embodiment will be described below with reference to FIG. 9.

To begin, the comparative embodiment includes a vehicle speed command generation unit (ACC) and a vehicle speed command generation unit (vehicle speed limit), which serve as vehicle speed command generation units, and a lowest value among vehicle speed command values generated by the two vehicle speed command generation units is set as a target vehicle speed.

Here, deceleration to the speed limit due to fog appearing starts at time $t_0$, and a leading vehicle is lost at time $t_1$ immediately after the deceleration starts. In this situation, the vehicle speed command values (i.e., speed-limited target vehicle speeds) generated by the vehicle speed command generation unit (vehicle speed limit) are large vehicle speed command values up until time $t_0$, and have vehicle speed command value characteristics that fall at a constant rate of deceleration from time $t_0$ to time $t_3$ and stay at the vehicle speed limit (fog) after time $t_3$. The vehicle speed command values (i.e., leading-vehicle-following target vehicle speeds) generated by the vehicle speed command generation unit (ACC) are vehicle speed command values using headway control to follow the leading vehicle up until time $t_1$, and have a vehicle speed command value characteristic that instantly increases so as to return to a driver-set vehicle speed upon reaching time $t_1$. In the vehicle speed command generation unit (ACC), the driver-set vehicle speed is held outside the vehicle speed command value characteristics.

When target vehicle speed characteristics are drawn selecting the lowest values among the vehicle speed command values generated by the two vehicle speed command generation units, the target vehicle speed characteristic up until time $t_1$ follows the leading-vehicle-following target vehicle speed characteristic. Upon reaching time $t_1$, the target vehicle speed characteristic instantly rises to the driver-set vehicle speed from the host vehicle speed at the time the leading vehicle was lost. The target vehicle speed characteristic from time $t_1$ to time $t_2$ is a vehicle speed that remains constant in accordance with the driver-set vehicle speed characteristic, and after time $t_2$ follows the speed limit characteristic.

Thus, as illustrated by the target vehicle speed characteristics enclosed at arrow A in FIG. 9, unnecessary acceleration is produced despite knowing that deceleration is upcoming due to the target vehicle speed characteristic instantly rising to the driver-set vehicle speed at time $t_1$ from the host vehicle speed at the time the leading vehicle was lost. Moreover, due to there being lag in responding to a target vehicle speed, the actual vehicle speed of the host vehicle will transition from acceleration to deceleration immediately after time $t_2$, at which point there will be a large amount of jerk (change in the rate of acceleration) when switching from acceleration (a positive rate of acceleration) to deceleration (a negative rate of acceleration). With a driving-assisted vehicle such as an autonomously driven vehicle, because this "unnecessary acceleration" and "large amount of jerk" is not due to an acceleration operation or a brake operation by the driver, but is unintended by the driver, an unpleasant sensation is imparted to the driver. Similarly, this "unnecessary acceleration" and "large amount of jerk" are unpleasant sensations to fellow passengers as well.

For the sake of argument, in order to suppress "unnecessary acceleration" in the comparative embodiment, suppose a countermeasure is implemented in which acceleration and changing of the target vehicle speed are prohibited. In this situation, a problem will arise where, e.g., when a target vehicle speed that accords with a stop line has been selected, acceleration of the host vehicle is prohibited even in situations where the distance to the stop line is fairly long, and differences in vehicle speed between the host vehicle and other vehicles in the area around the host vehicle can obstruct the flow of traffic.

Operation for Process of Generating a Target Vehicle Speed

Figure 8:
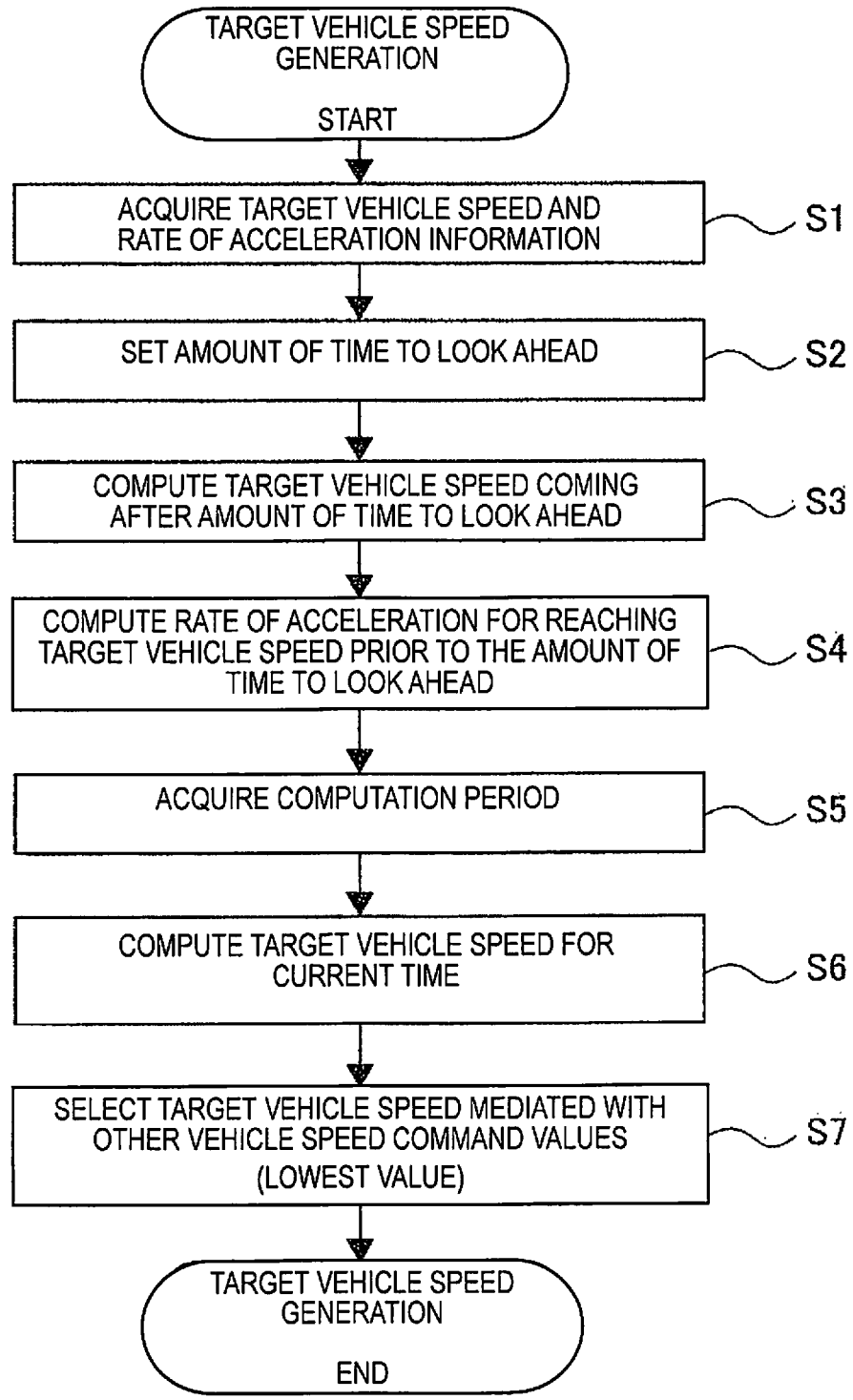
FIG. 8 is a flowchart illustrating the flow of a process for generating a target vehicle speed executed by an autonomous driving control unit in the first embodiment.

FIG. 8 illustrates the flow of a process for generating a target vehicle speed executed by the autonomous driving control unit 2 in the first embodiment. Each step in FIG. 8 will be described below.

When target vehicle speed generation starts, target vehicle speed and rate of acceleration information is acquired in step S1, then the process advances to step S2. Herein, "acquiring target vehicle speed and rate of acceleration information" refers to acquiring, in the look-ahead vehicle speed command calculation units 221 to 224, a vehicle speed command value (target vehicle speed) and a target rate of acceleration generated in each speed command generation unit 211 to 214.

Following the acquisition of the target vehicle speed and rate of acceleration information in step S1, an amount of time to look ahead is set in step S2, then the process advances to step S3. Herein, "setting an amount of time to look ahead" refers to an amount of time to look ahead being set to an amount of time that can change in the look-ahead vehicle speed command computation unit 22a in accordance with conditions (a) to (d) as described above.

Following the setting of an amount of time to look ahead in step S2, a target vehicle speed that comes after the amount of time to look ahead is computed in step S3, then the process advances to step S4. Herein, "computing a target vehicle speed that comes after the amount of time to look ahead" refers to computing a look-ahead vehicle speed command value (target vehicle speed) that comes after the elapse of the amount of time to look ahead based on the target rate of acceleration and the vehicle speed command value at the present point in time in the look-ahead vehicle speed command computation unit 22a.

Following the computation of a target vehicle speed that comes after the amount of time to look ahead in step S3, a rate of acceleration for reaching the target vehicle speed prior to the amount of time to look ahead is computed in step S4, then the process advances to step S5. Herein, "computing a rate of acceleration for reaching the target vehicle speed prior to the amount of time to look ahead" refers to computing a rate of acceleration required to reach the most recent look-ahead vehicle speed command value (the target vehicle speed prior to the amount of time to look ahead) from the next-most-recent vehicle speed command value (next-most-recent target vehicle speed) in the requisite rate of acceleration computation unit 22b.

Following the computation of a rate of acceleration for reaching the target vehicle speed prior to the amount of time to look ahead in step S4, a computation period is acquired in step S5, then the process advances to step S6. Herein, "acquiring a computation period" refers to acquiring a computation period (sample interval) in the vehicle speed command computation unit 22c.

Following the acquisition of the computation period in step S5, a target vehicle speed for the current time is computed in step S6, and the process advances to step S7. Herein, "computing a target vehicle speed for the current time" refers to computing a vehicle speed command value (target vehicle speed) for the current time from the requisite rate of acceleration, the computation period (sample interval), and the next-most-recent vehicle speed command value in the vehicle speed command computation unit 22c.

Following the computation of the target vehicle speed for the current time in step S6, a target vehicle speed is selected (the lowest value) through mediation with other vehicle speed command values in step S7, and the process advances to the end of the target vehicle speed generation. Herein, "selecting a target vehicle speed through mediation with other vehicle speed command values" refers to selecting the lowest value among the plurality of look-ahead vehicle speed command values calculated by the look-ahead vehicle speed command calculation units 221, 222, 223, 224 as the target vehicle speed in the lowest vehicle speed command mediation unit 23.

Thus, when target vehicle speed generation starts, the steps advance in the order of step S1→step S2→step S3→step S4→step S5→step S6→step S7, then the target vehicle speed generation ends. In other words, in the look-ahead vehicle speed command calculation units 22, a look-ahead vehicle speed command value that comes after the elapse of a prescribed amount of time from the present time is calculated for each vehicle speed command value generated by the plurality of vehicle speed command generation units 211 to 214. Then, in the lowest vehicle speed command mediation unit 23, the lowest value among the plurality of look-ahead vehicle speed command values calculated by the look-ahead vehicle speed command calculation units 221 to 224 is selected as the target vehicle speed.

By selecting the lowest value among the plurality of look-ahead vehicle speed command values as the target vehicle speed, unnecessary acceleration can be suppressed and moreover jerk at a time of transition from acceleration to deceleration can be reduced when traveling using autonomous driving or the like. Moreover, e.g., when a target vehicle speed that accords with a stop line has been selected, acceleration of the host vehicle is permitted in situations where a distance to the stop line is longer than a distance reached by the host vehicle in the amount of time to look ahead and the vehicle speed that comes after the amount of time to look ahead is higher than the vehicle speed at the present point in time. Because of this, by implementing select-low for the look-ahead vehicle speed command values rather than a technique that merely prohibits acceleration, the obstruction of the flow of traffic can be avoided.

Figure 10:
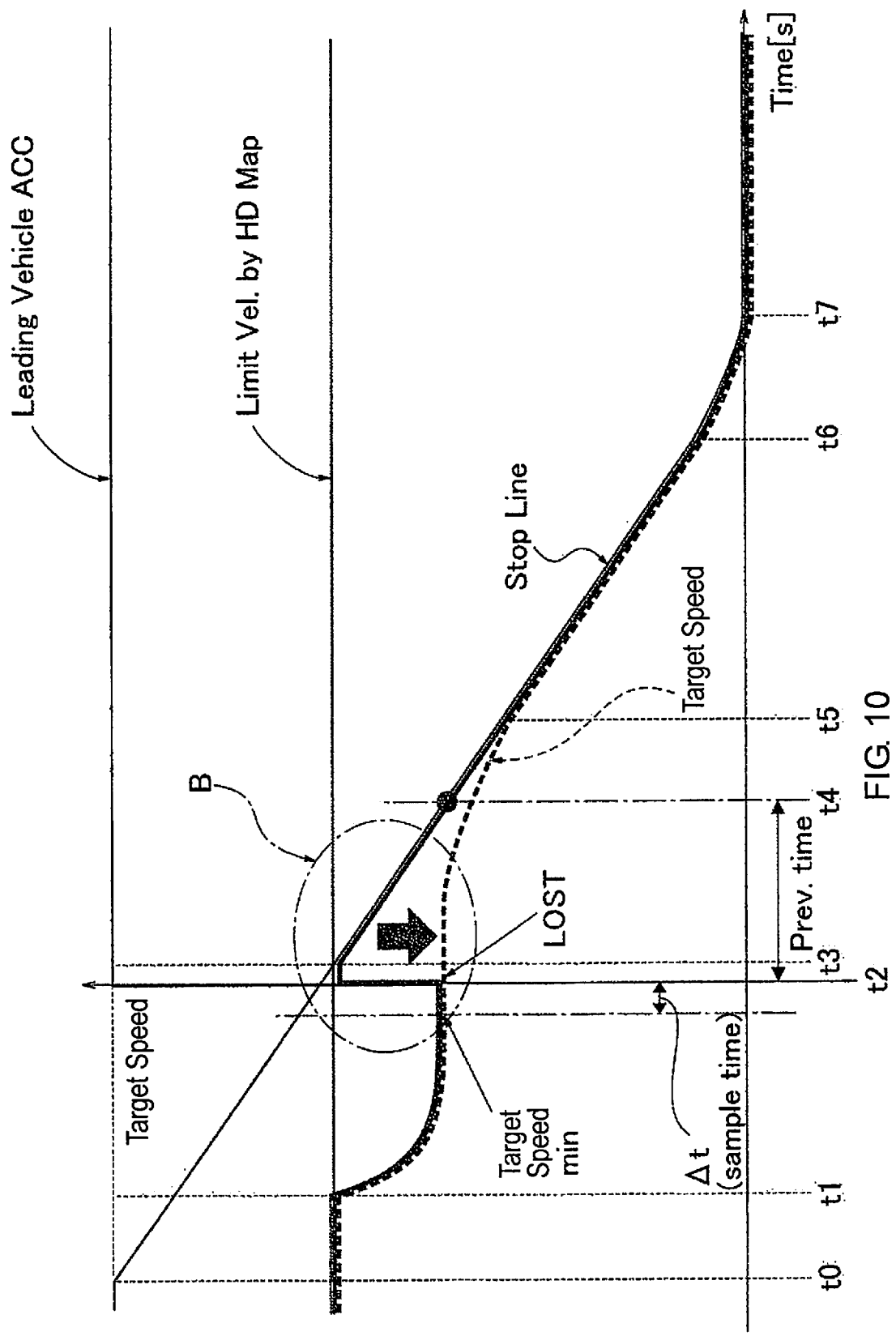
FIG. 10 is a time chart illustrating target vehicle speed (lowest values of look-ahead vehicle speeds) characteristics in the first embodiment in a deceleration-to-a-stop scenario in which after starting to decelerate heading toward an upcoming stop line, a leading vehicle is lost.

Operation for Generating a Target Vehicle Speed in a Deceleration-to-A-Stop Scenario in which there is a Stop Line FIG. 10 illustrates target vehicle speed (lowest values of look-ahead vehicle speeds) characteristics in a deceleration-to-a-stop scenario in which after starting to decelerate heading toward an upcoming stop line, a leading vehicle is lost. Operation for generating a target vehicle speed in a deceleration-to-a-stop scenario in which there is a stop line will be described below with reference to FIG. 10.

Here, deceleration due to detecting a stop line starts at time $t_0$, and a leading vehicle is lost at time $t_2$ after the deceleration starts. In this situation, the vehicle speed command values generated by the first vehicle speed command generation unit (ACC) 211 are driver-set vehicle speeds up until time $t_1$, over which period there is no a leading vehicle, and these vehicle speed command values are vehicle speed command values using headway control to follow a leading vehicle from time $t_1$ up until time $t_2$, over which period there is a leading vehicle. These vehicle speed command values have a vehicle speed command value characteristic that instantly increases so as to return to a driver-set vehicle speed upon reaching time $t_2$. The vehicle speed command values generated by the second vehicle speed command generation unit (stop line) 212 are large vehicle speed command values up until time $t_0$, and have vehicle speed command value characteristics that fall at a constant rate of deceleration from time $t_0$ to time $t_6$, and from time $t_6$ up until time $t_7$, follow a stop line characteristic for a rate of deceleration that comes to a stop smoothly. The vehicle speed command values generated by the third vehicle speed command generation unit (vehicle speed limit) 213 have a vehicle speed command value characteristic that is held at a constant vehicle speed limit regardless of the time.

When target vehicle speed characteristics (thick solid line characteristics) are drawn selecting the lowest values among the vehicle speed command values generated by the three vehicle speed command generation units 211, 212, 213, the target vehicle speed characteristic from time $t_1$ up until time $t_2$ follows the leading-vehicle-following target vehicle speed characteristic. Upon reaching time $t_2$, the target vehicle speed characteristic instantly rises to the vehicle speed limit from the host vehicle speed at the time the leading vehicle was lost. The target vehicle speed characteristic from time $t_2$ to time $t_3$ is a vehicle speed that remains constant in accordance with the vehicle speed limit characteristic, and after time $t_3$ the stop line characteristic is followed.

In contrast, target vehicle speed characteristics (thick dashed line characteristics) are drawn selecting the lowest values among look-ahead vehicle speed command values that come after the elapse of an amount of time to look ahead (from time $t_2$ to time $t_4$ in FIG. 10) for each vehicle speed command value generated by the three vehicle speed command generation units 211, 212, 213. In this situation, upon reaching time $t_2$, a target vehicle speed is chosen based on the lowest value of the look-ahead vehicle speed command values at time $t_4$, whereby there is almost no change from the actual vehicle speed of the host vehicle at time $t_2$. Subsequent to time $t_2$, because the target vehicle speed in each sample interval $\Delta t$ is chosen based on the lowest value of the look-ahead vehicle speed command values at the amount of time to look ahead, the characteristic linking the target vehicle speeds chosen in each sample interval $\Delta t$ smoothly decelerates from time $t_2$ to time $t_5$. After time $t_5$, the stop line characteristic is followed.

Thus, as is clear from a comparison of the target vehicle speed characteristics (the thick solid line characteristics and the thick dashed line characteristics) enclosed at arrow B in FIG. 10, the target vehicle speed characteristics (the thick dashed line characteristics) in the first embodiment are characteristics in which the target vehicle speed characteristics (the thick solid line characteristics) in the comparative embodiment are pushed toward the deceleration side. Consequently, due to generating target vehicle speeds based on look-ahead vehicle speed command values when it is known that deceleration is upcoming, the production of unnecessary acceleration such as in the comparative embodiment is suppressed. Moreover, because the target vehicle speed characteristics in the first embodiment smoothly decelerate from time $t_2$ to time $t_5$, jerk when switching from acceleration to deceleration is practically eliminated, or jerk is reduced to a small amount.

As a result, due to exhibiting vehicle behavior suppression functionality needed in situations involving a driving-assisted vehicle such as an autonomously driven vehicle, an unpleasant sensation is not imparted to the driver or fellow passengers. Moreover, due to selecting the lowest value among a plurality of look-ahead vehicle speed command values as the target vehicle speed, a vehicle speed plan in which travel safety is ensured is formed from among the plurality of look-ahead vehicle speed command values. the first embodiment will also display operation for generating a target vehicle speed that is similar to the situation in which deceleration is started heading toward an upcoming stop line in a travel scenario such as in the comparative embodiment in which immediately after starting to decelerate to a speed limit due to fog appearing, a leading vehicle is lost.

Figure 11:
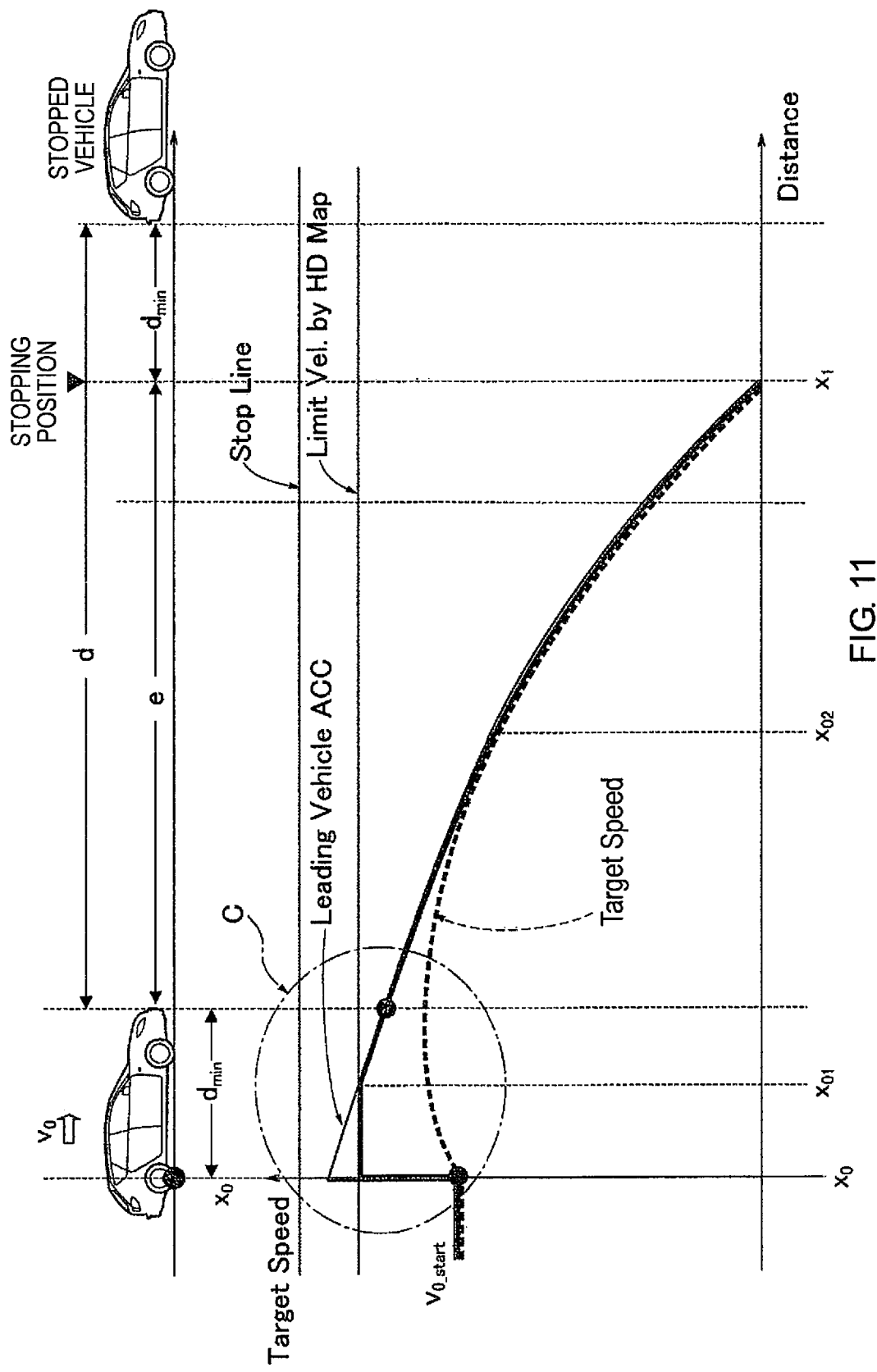
FIG. 11 is a target vehicle speed characteristic chart illustrating characteristics relating target vehicle speeds and distance from a host vehicle to a stopped vehicle in the first embodiment in a deceleration-to-a-stop scenario in which, when a stopped vehicle is present in front of the host vehicle, the host vehicle comes to a stop at a position immediately behind the stopped vehicle from travel at a vehicle speed below a vehicle speed limit.

Operation for Generating a Target Vehicle Speed in a Deceleration-to-A-Stop Scenario in which there is Stopped Vehicle FIG. 11 illustrates characteristics relating target vehicle speeds and distance from a host vehicle to a stopped vehicle in the first embodiment in a deceleration-to-a-stop scenario in which, when a stopped vehicle is present in front of the host vehicle, the host vehicle comes to a stop at a position immediately behind the stopped vehicle from travel at a vehicle speed below a vehicle speed limit. Operation for generating a target vehicle speed in a deceleration-to-a-stop scenario in which there is stopped vehicle will be described below with reference to FIG. 11.

In this deceleration-to-a-stop scenario in which there is stopped vehicle, a rear wheel position of the host vehicle when a stopped vehicle is recognized is denoted as $x_0$, a rear wheel position of the host vehicle upon decelerating and coming to a stop is denoted as $x_1$, and a distance from position $x_0$ to a front end position of the host vehicle is denoted $d_{min}$. Here, a distance from the front end position of the host vehicle at position $x_0$ to the front end position of the host vehicle at position $x_1$ is $d(=e+d_{min})$, and it is necessary that the vehicle speed of the host vehicle be brought to zero (come to a stop) from a vehicle speed $v_0$ at position $x_0$ within this distance d.

In this situation, as a result of the host vehicle, which is traveling at a vehicle speed below a vehicle speed limit, recognizing a stopped vehicle as a leading vehicle at position $x_0$, the vehicle speed command values generated by the first vehicle speed command generation unit (ACC) 211 instantly increase due to headway control that follows a leading vehicle. Subsequent to position $x_0$, these vehicle speed command values have a vehicle speed command value characteristic that decelerates gradually heading toward position $x_1$ due to headway control. The vehicle speed command values generated by the second vehicle speed command generation unit (stop line) 212 have a vehicle speed command value characteristic that is held at a constant stop-line vehicle speed regardless of the time due to there being no recognition of a stop line. The vehicle speed command values generated by the third vehicle speed command generation unit (vehicle speed limit) 213 have a vehicle speed command value characteristic that is held at a constant vehicle speed limit (<stop-line vehicle speed) regardless of the time.

When target vehicle speed characteristics (the thick solid line characteristics) are drawn selecting the lowest value among the vehicle speed command values generated by the three vehicle speed command generation units 211, 212, 213, there is an instant rise following the leading-vehicle-following target vehicle speed characteristic to the vehicle speed limit from the host vehicle speed at position $x_0$. The target vehicle speed characteristic from position $x_0$ to position $x_{01}$ is a vehicle speed that remains constant in accordance with the vehicle speed limit characteristic, and after position $x_{01}$ the leading-vehicle-following target vehicle speed characteristic is followed.

In contrast, target vehicle speed characteristics (the thick dashed line characteristics) are drawn selecting the lowest value among look-ahead vehicle speed command values that come after the elapse of amount of time to look ahead for each vehicle speed command value generated by the three vehicle speed command generation units 211, 212, 213. In this situation, upon reaching position $x_0$, the target vehicle speed in each sample interval $\Delta t$ is chosen based on the lowest value of the look-ahead vehicle speed command values at the amount of time to look ahead. Because of this, the characteristic linking the target vehicle speeds chosen in each sample interval $\Delta t$ is a smooth characteristic that moves from gentle acceleration to gentle deceleration heading toward position $x_{02}$ from position $x_0$. After position $x_{02}$, the leading-vehicle-following target vehicle speed characteristic, which is a deceleration characteristic, is followed.

Thus, as is clear from a comparison of the target vehicle speed characteristics (the thick solid line characteristics and the thick dashed line characteristics) enclosed at arrow C in FIG. 11, the target vehicle speed characteristics (the thick dashed line characteristics) in the first embodiment are characteristics in which the target vehicle speed characteristics (the thick solid line characteristics) in the comparative embodiment are pushed toward the deceleration side. Consequently, due to generating target vehicle speeds based on look-ahead vehicle speed command values when it is known that deceleration is upcoming, the production of unnecessary acceleration such as in the comparative embodiment is suppressed. Moreover, because the target vehicle speed characteristics in the first embodiment have a smooth characteristic that moves from gentle acceleration to gentle deceleration heading toward position $x_{02}$ from position $x_0$, jerk when switching from acceleration to decelerating is reduced to a small amount. Thus, the production of acceleration for approaching a vehicle speed limit is suppressed in a deceleration-to-a-stop scenario in which, when a stopped vehicle is present in front of the host vehicle, the host vehicle comes to a stop at a position immediately behind the stopped vehicle from travel at a vehicle speed below a vehicle speed limit.

Figure 12:
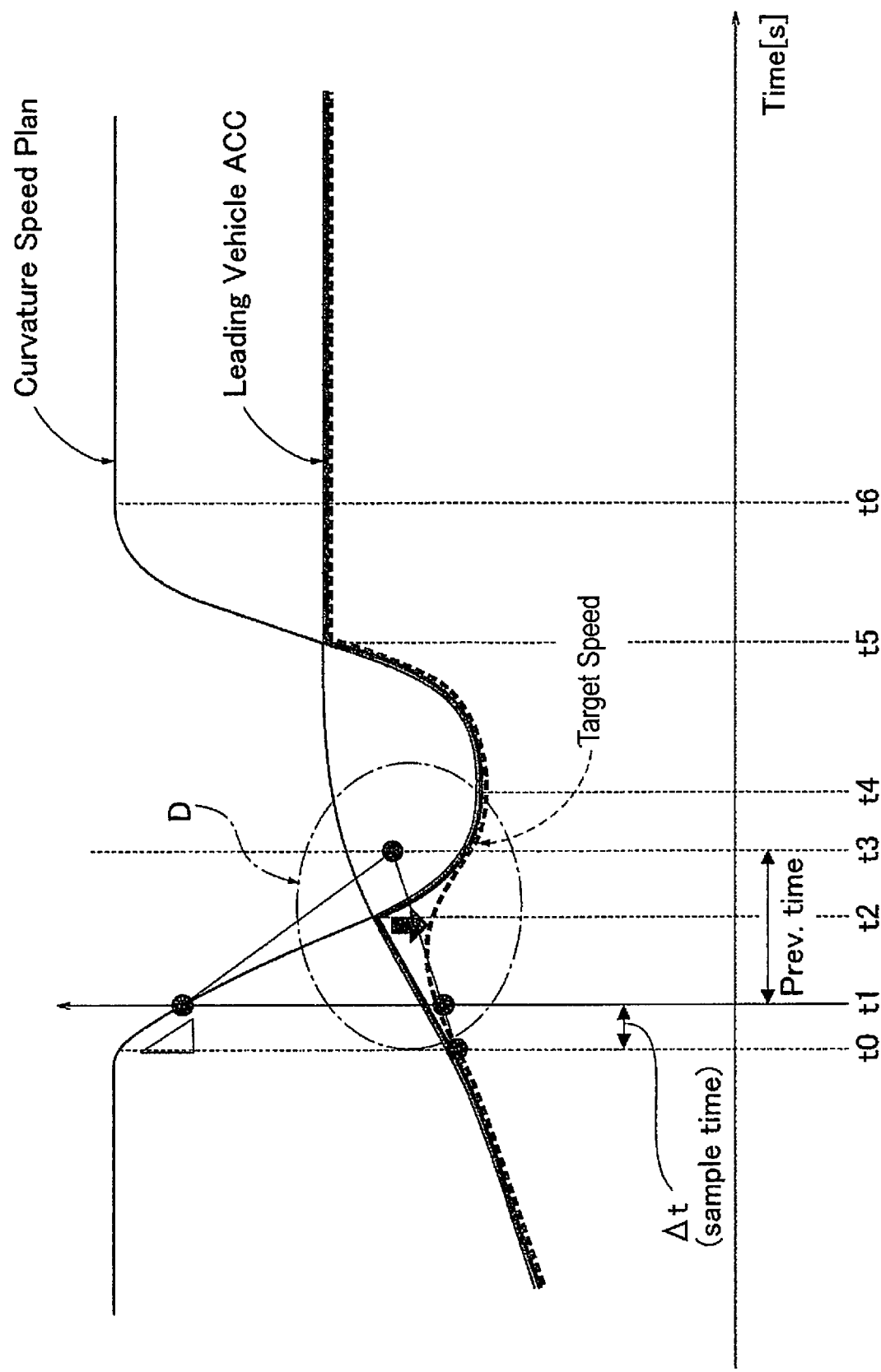
FIG. 12 is a time chart illustrating target vehicle speed characteristics in the first embodiment in a decelerate-while-turning scenario in which, although a leading vehicle is accelerating, there is a corner coming up where deceleration should be performed.

Operation for Generating a Target Vehicle Speed in a Decelerate-while-Turning Scenario FIG. 12 illustrates target vehicle speed characteristics in the first embodiment in a decelerate-while-turning scenario in which, although a leading vehicle is accelerating, there is a corner coming up where deceleration should be performed. Operation for generating a target vehicle speed in a decelerate-while-turning scenario will be described below with reference to FIG. 12.

Here, although the leading vehicle is accelerating, deceleration due to entering a corner starts at time $t_0$, a minimum vehicle speed is reached and a transition is made from deceleration to acceleration at time $t_4$ while turning the corner, and the corner is exited at time $t_6$. In this situation, because the leading vehicle is accelerating, the vehicle speed command values generated by the first vehicle speed command generation unit (ACC) 211 have a vehicle speed command value characteristic that accords with a leading-vehicle-following target vehicle speed characteristic in which vehicle speed gradually rises due to headway control that follows the leading-vehicle from before time $t_0$. The vehicle speed command values generated by the fourth speed command generation unit (corner deceleration) 214 are large vehicle speed command values for forward travel up until time $t_0$. These vehicle speed command values have a vehicle speed command value characteristic that follows a corner target vehicle speed characteristic that gradually falls due to deceleration from time $t_0$ to time $t_4$ and in which vehicle speed rises due to acceleration from time $t_4$, where the minimum vehicle speed is obtained, to time $t_6$.

When target vehicle speed characteristics (thick solid line characteristics) are drawn selecting the lowest values among the vehicle speed command values generated by the two vehicle speed command generation units 211, 214, the target vehicle speed characteristic up until time $t_2$ follows the leading-vehicle-following target vehicle speed characteristic. The target vehicle speed characteristic from time $t_2$ to time $t_5$ follows the corner target vehicle speed characteristic. After time $t_5$, the leading-vehicle-following target vehicle speed characteristic is followed once more.

In contrast, target vehicle speed characteristics (thick dashed line characteristics) are drawn selecting the lowest values among look-ahead vehicle speed command values that come after the elapse of amount of time to look ahead (from time $t_1$ to time $t_3$ in FIG. 12) for each vehicle speed command value generated by the two vehicle speed command generation units 211, 214. In this situation, upon reaching time $t_0$, a target vehicle speed is chosen based on the lowest value of the look-ahead vehicle speed command values, whereby there is almost no change from the actual vehicle speed of the host vehicle at time $t_0$. Subsequent to time $t_0$, because the target vehicle speed in each sample interval $\Delta t$ is chosen based on the lowest value of the look-ahead vehicle speed command values at the amount of time to look ahead, the characteristic linking the target vehicle speeds chosen in each sample interval $\Delta t$ gently decelerates after gently accelerating from time $t_0$ to time $t_3$. From time $t_3$ up until time $t_5$, the corner target vehicle speed characteristic is followed, and after time $t_5$ the leading-vehicle-following target vehicle speed characteristic is followed.

Thus, as is clear from a comparison of the target vehicle speed characteristics (the thick solid line characteristics and the thick dashed line characteristics) enclosed at arrow D in FIG. 12, the target vehicle speed characteristics (the thick dashed line characteristics) in the first embodiment are characteristics in which the target vehicle speed characteristics (the thick solid line characteristics) in the comparative embodiment are pushed toward the deceleration side. Consequently, due to generating target vehicle speeds based on look-ahead vehicle speed command values when it is known that deceleration is upcoming, the production of unnecessary acceleration such as in the comparative embodiment is suppressed. Moreover, because the target vehicle speed characteristics in the first embodiment have a characteristic that gently decelerates after gently accelerating from time $t_0$ to time $t_3$, jerk when switching from acceleration to deceleration is reduced to a small amount.

Thus, in situations in which although a leading vehicle is accelerating, there is a corner coming up where deceleration should be performed, a host vehicle is suppressed from accelerating to follow a leading vehicle that is accelerating, and the host vehicle starts to decelerate in conformance with the corner. As shall be apparent, this is also applicable to situations in which there is a tight corner in front of the host vehicle subject to deceleration.

Next, the effects of the present disclosure will be described. The effects given below by way of example are achieved with the method and device for generating a target vehicle speed of an autonomously driven vehicle of the first embodiment.

(1) A method for generating a target vehicle speed of a driving-assisted vehicle (autonomously driven vehicle) that generates a target vehicle speed for when the vehicle is to travel/stop based on a plurality of vehicle speed command values.

A look-ahead vehicle speed command value that comes after the elapse of a prescribed amount of time from a present time is calculated for each vehicle speed command value of the plurality of vehicle speed command values (look-ahead vehicle speed command calculation unit 22). A lowest value among the plurality of calculated look-ahead vehicle speed command values is selected as the target vehicle speed (lowest vehicle speed command mediation unit 23; FIG. 1). Accordingly, a method for generating a target vehicle speed of an autonomously driven vehicle can be provided with which unnecessary acceleration can be suppressed and moreover jerk at a time of transition from acceleration to deceleration is reduced when traveling using driver-assistance (autonomous driving). That is, control in which future values of target vehicle speeds are forecast is possible, and unnecessary acceleration can be suppressed. Jerk when switching from acceleration to deceleration can be reduced. Furthermore, by adopting lowest values, a vehicle speed plan on the side of safety can be formed from among the plurality of vehicle speed command values.

(2) In calculating the look-ahead vehicle speed command values (look-ahead vehicle speed command calculation units 22), a look-ahead vehicle speed command value that comes after the elapse of an amount of time to look ahead is computed based on a vehicle speed command value at a present point in time, a target rate of acceleration, and the amount of time to look ahead (look-ahead vehicle speed command computation unit 22a). A requisite rate of acceleration required to reach a most recent look-ahead vehicle speed command value from a next-most-recent vehicle speed command value is computed (requisite rate of acceleration computation unit 22b). A look-ahead vehicle speed command value for a current time is computed from the requisite rate of acceleration, a computation period, and the next-most-recent vehicle speed command value (vehicle speed command computation unit 22c; FIG. 7). Accordingly, on top of the effect of (1), look-ahead vehicle speed command values can be computed in real time. Because look-ahead vehicle speed command values are computed per computation period (sample interval), applications can also be found in situations in which future target vehicle speeds are not known.

(3) In computing the look-ahead vehicle speed command value (look-ahead vehicle speed command computation unit 22a), when the amount of time to look ahead is changed according to targeted acceleration/deceleration behavior, in situations where delayed-response control is desired, the amount of time to look ahead is set to a longer amount of time than in situations where heightened-response control is desired (FIG. 7). Accordingly, on top of the effect of (2), in situations where delayed-response control is desired, acceleration/deceleration behavior can be made smoother, and the amount of time necessary to switch from acceleration to deceleration can be shortened.

(4) In computing the look-ahead vehicle speed command value (look-ahead vehicle speed command computation unit 22a), in situations where the look-ahead vehicle speed command value is a vehicle speed command value relating to a vehicle speed limit, the amount of time to look ahead is set longer than for other vehicle speed command values (FIG. 7). Accordingly, on top of the effect of (2) or (3), the vehicle speed of the host vehicle can be made to smoothly follow the vehicle speed limit.

(5) In computing the look-ahead vehicle speed command value (look-ahead vehicle speed command computation unit 22a), when the amount of time to look ahead is changed according to targeted acceleration/deceleration behavior, in situations where heightened-response control is desired, the amount of time to look ahead is set to a shorter amount of time than in situations where delayed-response control is desired (FIG. 7). Accordingly, on top of the effects of (2) to (4), in situations where heightened-response control is desired, acceleration/deceleration behavior can be made quicker, the amount of time to switch from acceleration to deceleration can be prolonged, and the number of acceleration segments can be increased.

(6) In computing the look-ahead vehicle speed command value (look-ahead vehicle speed command computation unit 22a), in situations where the look-ahead vehicle speed command value is a vehicle speed command value relating to following a leading vehicle, the amount of time to look ahead is set shorter than for other vehicle speed command values (FIG. 7). Accordingly, on top of the effects of (2) to (5), the host vehicle can be made to quickly follow a leading vehicle.

(7) In calculating the look-ahead vehicle speed command values (look-ahead vehicle speed command calculation unit 22), in situations where the requisite rate of acceleration has exceeded a maximum rate of acceleration set beforehand, rather than selecting the most recent look-ahead vehicle speed command value, a next-most-recent look-ahead vehicle speed command value is selected (acceleration suppression/prevention unit 22e; FIG. 7). Accordingly, on top of the effects of (2) to (6), the suppression of acceleration in a scenario in which acceleration is actually desired can be avoided.

(8) In calculating the look-ahead vehicle speed command values (look-ahead vehicle speed command calculation unit 22), when the look-ahead vehicle speed command value for the current time exceeds a range of vehicle speeds the target vehicle speed is capable of handling, the look-ahead vehicle speed command value for the current time is limited by the range of vehicle speeds the target vehicle speed is capable of handling (vehicle speed limiter unit 22d; FIG. 7). Accordingly, on top of the effects of (2) to (7), it is possible to prevent the target vehicle speed from assuming a negative value and prevent any unnecessary degree of deceleration from occurring.

(9) In selecting a lowest value among the plurality of look-ahead vehicle speed command values and generating the target vehicle speed, a rate of acceleration/deceleration limit that corresponds to a type of the selected look-ahead vehicle speed is selected at the same time (lowest vehicle speed command mediation unit 23; FIG. 1). Accordingly, on top of the effects of (1) to (8), due to applying a rate of acceleration/deceleration limit in accordance with a type of the selected target vehicle speed, individual acceleration/deceleration behaviors corresponding to the type of target vehicle speed are made possible. For example, when a target vehicle speed set using a vehicle speed limit is selected, smooth following is made possible by reducing the rate of acceleration/deceleration. Alternatively, when a target vehicle speed set using ACC is selected, following responsively with respect to changes in the position of a leading vehicle is made possible by increasing the rate of acceleration/deceleration.

(10) In generating the vehicle speed command values (first vehicle speed command generation unit 211), the headway distance to and relative vehicle speed of a leading vehicle is acquired (headway distance and relative vehicle speed acquisition unit 211b), and a vehicle speed command value required for the host vehicle to follow the leading vehicle is calculated in accordance with the acquired headway distance and relative vehicle speed (vehicle speed command calculation unit 211c; FIG. 2). Accordingly, on top of the effects of (1) to (9), in situations where a vehicle is stopped in front of the host vehicle or situations where a vehicle with a low vehicle speed is present in front of the host vehicle, unnecessary acceleration occurring before such situations (for example, acceleration for following a vehicle speed limit) can be suppressed.

(11) In generating the vehicle speed command values (third vehicle speed command generation unit 213), vehicle speed limit information for a road is acquired (vehicle speed limit acquisition unit 213a), and a vehicle speed command value required to follow the acquired vehicle speed limit is calculated (vehicle speed command calculation unit 213b; FIG. 5). Accordingly, on top of the effects of (1) to (10), in situations where it is known that a vehicle speed limit will fall in front of the host vehicle, unnecessary acceleration occurring before such situations can be suppressed.

(12) In generating the vehicle speed command values (second vehicle speed command generation unit 212) a distance from the host vehicle to a stop line is acquired (relative-distance-to-stop-line acquisition unit 212a), and a vehicle speed command value required to decelerate and stop within the acquired relative distance to the stop line is calculated (vehicle speed command calculation unit 212b; FIG. 3). Accordingly, on top of the effects of (1) to (11), in situations where it is known that deceleration and stopping will occur (for example, when there is a stop line in front of the host vehicle, when a traffic signal in front of the host vehicle is red, etc.), unnecessary acceleration occurring before such situations can be suppressed.

(13) In generating the vehicle speed command values (fourth vehicle speed command generation unit 214), a curvature of a traveled-on road is acquired (road curvature information acquisition unit 214a), and a vehicle speed command value not exceeding a maximum lateral rate of acceleration that is set in advance is calculated in accordance with the acquired road curvature information (vehicle speed command calculation unit 214b; FIG. 6). Accordingly, on top of the effects of (1) to (12), in situations where there is a tight corner in front of the host vehicle and it is known that deceleration will be performed in advance, unnecessary acceleration occurring before such situations can be suppressed.

(14) A device for generating a target vehicle speed of a driving-assisted vehicle (autonomously driven vehicle) equipped with a controller (autonomous driving control unit 2) that includes a plurality of vehicle speed command generation units 21 and generates a target vehicle speed for when the vehicle is to travel/stop, wherein the controller (autonomous driving control unit 2) comprises a look-ahead vehicle speed command calculation unit 22 and a lowest vehicle speed command mediation unit 23. The look-ahead vehicle speed command calculation unit 22 calculates a look-ahead vehicle speed command value that comes after the elapse of a prescribed amount of time from a present time for each vehicle speed command value generated by the plurality of vehicle speed command generation units 21. The lowest vehicle speed command mediation unit 23 selects a lowest value among the plurality of look-ahead vehicle speed command values calculated by the look-ahead vehicle speed command calculation unit as the target vehicle speed (FIG. 1). Accordingly, a device for generating a target vehicle speed of an autonomously driven vehicle can be provided with which unnecessary acceleration can be suppressed and moreover jerk at a time of transition from acceleration to deceleration is reduced when traveling using driver-assistance (autonomous driving).

In the foregoing, a device for generating a target vehicle speed of a driving-assisted vehicle of the present disclosure was described with reference to the first embodiment. However, the specific configuration thereof is not limited to that of the first embodiment, and design modifications, additions, etc., are possible without departing from the spirit of the invention as set forth in the accompanying claims.

In the first embodiment, an example was presented in which, as the vehicle speed command generation units 21 and the look-ahead vehicle speed command calculation units 22, four types of vehicle speed command generation units and look-ahead vehicle speed command calculation units, corresponding to ACC, stop line, vehicle speed limit, and corner deceleration, were provided. However, the example could be that in which, as vehicle speed command generation units and look-ahead vehicle speed command calculation units, two or more types of vehicle speed command generation units and look-ahead vehicle speed command calculation units are provided. This encompasses examples in which two, three, or five or more types of vehicle speed command generation units and look-ahead vehicle speed command calculation units are provided.

In the first embodiment, an example was presented in which the method and device for generating a target vehicle speed of the present disclosure are applied to an autonomously driven vehicle in which steering/drive/braking are automatically controlled according to an autonomous driving mode selection. However, the method and device for generating a target vehicle speed of the present disclosure can be applied to any vehicle that assists the driving of a driver using a target vehicle speed, such as a driving-assisted vehicle that assists the driving of a driver by displaying a target vehicle speed or a driving-assisted vehicle equipped only with ACC.

The invention claimed is:

1. A target vehicle speed generation method for generating a target vehicle speed of a host vehicle having a controller including a processor, the controller being configured to control the host vehicle to travel or stop based on the target vehicle speed and to generate the target vehicle speed based on a plurality of vehicle speed command values related to different driving situations, the target vehicle speed generation method comprising utilizing the controller to generate the target vehicle speed by: calculating a look-ahead vehicle speed command value for each vehicle speed command value of the plurality of vehicle speed command values to obtain a plurality of the look-ahead vehicle speed command values, the calculating the look-ahead vehicle speed command value for each of the vehicle speed command values including: calculating a first look-ahead vehicle speed command value that comes after an amount of time to look ahead based on a next-most-recent target vehicle speed, a target acceleration, and the amount of time to look ahead, calculating a requisite acceleration to reach the first look-ahead vehicle speed command value based on the first look-ahead vehicle speed command value and the next-most-recent target vehicle speed, calculating a second look-ahead vehicle speed command value that comes after a computation period based on the requisite acceleration, the next-most-recent target vehicle speed, and the computation period;

and selecting a lowest value among the plurality of the look-ahead vehicle speed command values as the target vehicle speed.

2. The target vehicle speed generation method according to claim 1, further comprising
setting the amount of time to look ahead to a longer amount of time in situations where a delayed-response control is desired than in situations where a heightened-response control is desired.

3. The target vehicle speed generation method according to claim 1, further comprising
setting the amount of time to look ahead to be longer when the look-ahead vehicle speed command value corresponds to a vehicle speed command value related to a vehicle speed limit than when the look-ahead vehicle speed command value does not correspond to a vehicle speed command value related to a vehicle speed limit.

4. The target vehicle speed generation method according to claim 1, further comprising setting the amount of time to look ahead to a shorter amount of time in situations where a heightened-response control is desired than in situations where a delayed-response control is desired.

5. The target vehicle speed generation method according to claim 1, further comprising
setting the amount of time to look ahead to be shorter when the look-ahead vehicle speed command value corresponds to a vehicle speed command value related to following a leading vehicle than when the look-ahead vehicle speed command value does not correspond to a vehicle speed command value related to following a leading vehicle.

6. The target vehicle speed generation method according to claim 1, wherein
the calculating the look-ahead vehicle speed command value for each of the vehicle speed command values further includes
determining whether the requisite acceleration has exceeded a maximum acceleration set beforehand, and
using the next-most-recent look-ahead vehicle speed command value as the look-ahead vehicle speed command value when the requisite acceleration has exceeded the maximum acceleration.

7. The target vehicle speed generation method according to claim 1, wherein
the calculating the look-ahead vehicle speed command value for each of the vehicle speed command values further includes
limiting the second look-ahead vehicle speed command value based on a range of vehicle speeds the target vehicle speed is capable of handling to obtain a third look-ahead vehicle speed command value that does not exceed the range.

8. The target vehicle speed generation method according to claim 7, wherein the calculating the look-ahead vehicle speed command value for each of the vehicle speed command values further includes determining whether the requisite acceleration has exceeded a maximum acceleration set beforehand, using the third look-ahead vehicle speed command value as the look-ahead vehicle speed command value when the requisite acceleration has not exceeded the maximum acceleration, and using the next-most-recent look-ahead vehicle speed command value as the look- ahead vehicle speed command value when the requisite acceleration has exceeded the maximum acceleration.

9. The target vehicle speed generation method according to claim 1, further comprising setting an acceleration/deceleration limit that corresponds to a type of the vehicle speed command value to which the selected look-ahead vehicle speed command value corresponds.

10. The target vehicle speed generation method according to claim 1, wherein at least one of the vehicle speed command values is for a host vehicle to follow a leading vehicle and is calculated in accordance with an acquired headway distance to the leading vehicle and an acquired relative vehicle speed of the leading vehicle.

11. The target vehicle speed generation method according to claim 1, wherein at least one of the vehicle speed command values is calculated based on acquired vehicle speed limit information for a road on which the host vehicle travels to be used for controlling the host vehicle to follow an acquired vehicle speed limit.

12. The target vehicle speed generation method according to claim 1, wherein at least one of the vehicle speed command values is calculated based on a relative distance from the host vehicle to a stop line to be used for decelerating and stopping the host vehicle within the relative distance.

13. The target vehicle speed generation method according to claim 1, wherein at least one of the vehicle speed command values is calculated in accordance with acquired road curvature information regarding a road on which the host vehicle travels to be used for controlling the host vehicle not to exceed a maximum lateral acceleration that is set in advance.

14. A target vehicle speed generation device for generating a target vehicle speed of a host vehicle, the target vehicle speed generation device comprising:

a controller including a processor, the controller being configured to control the host vehicle to travel or stop based on the target vehicle speed and to generate the target vehicle speed based on a plurality of vehicle speed command values related to different driving situations, the controller being configured to calculate a look-ahead vehicle speed command value for each vehicle speed command value of the plurality of vehicle speed command values to obtain a plurality of the look-ahead vehicle speed command values, and select a lowest value among the plurality of the look-ahead vehicle speed command values as the target vehicle speed, the controller calculating the look-ahead vehicle speed command value for each of the vehicle speed command values by calculating a first look-ahead vehicle speed command value that comes after an amount of time to look ahead based on a next-most-recent target vehicle speed, a target acceleration, and the amount of time to look ahead, calculating a requisite acceleration to reach the first look-ahead vehicle speed command value based on the first look-ahead vehicle speed command value and the next-most-recent target vehicle speed, and calculating a second look-ahead vehicle speed command value that comes after a computation period based on the requisite acceleration, the next-most-recent target vehicle speed, and the computation period.

15. The target vehicle speed generation device according to claim 14, wherein the calculating the look-ahead vehicle speed command value for each of the vehicle speed command values further includes limiting the second look-ahead vehicle speed command value based on a range of vehicle speeds the target vehicle speed is capable of handling to obtain a third look-ahead vehicle speed command value that does not exceed the range, determining whether the requisite acceleration has exceeded a maximum acceleration set beforehand, using the third look-ahead vehicle speed command value as the look-ahead vehicle speed command value when the requisite acceleration has not exceeded the maximum acceleration, and using the next-most-recent look-ahead vehicle speed command value as the look-ahead vehicle speed command value when the requisite acceleration has exceeded the maximum acceleration.

* * * * *